(12) United States Patent
Takahashi et al.

(10) Patent No.: US 12,080,891 B2
(45) Date of Patent: Sep. 3, 2024

(54) POSITIVE ELECTRODE FOR SECONDARY BATTERY AND SECONDARY BATTERY

(71) Applicant: Panasonic Intellectual Property Management Co., Ltd., Osaka (JP)

(72) Inventors: Takahiro Takahashi, Osaka (JP); Kohei Saito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 758 days.

(21) Appl. No.: 17/267,253

(22) PCT Filed: Feb. 21, 2019

(86) PCT No.: PCT/JP2019/006522
§ 371 (c)(1),
(2) Date: Feb. 9, 2021

(87) PCT Pub. No.: WO2020/044609
PCT Pub. Date: Mar. 5, 2020

(65) Prior Publication Data
US 2021/0313579 A1    Oct. 7, 2021

(30) Foreign Application Priority Data

Aug. 30, 2018   (JP) ................. 2018-162097

(51) Int. Cl.
*H01M 4/62*    (2006.01)
*H01M 4/02*    (2006.01)
(Continued)

(52) U.S. Cl.
CPC ............. *H01M 4/62* (2013.01); *H01M 4/13* (2013.01); *H01M 10/0525* (2013.01); *H01M 2004/021* (2013.01); *H01M 2004/028* (2013.01)

(58) Field of Classification Search
CPC .......... H01M 4/62; H01M 4/13; H01M 4/665; H01M 4/667; H01M 4/663; H01M 10/0525; H01M 2004/021; H01M 2004/028
See application file for complete search history.

(56) References Cited

U.S. PATENT DOCUMENTS

2011/0027537 A1   2/2011   Inoue et al.
2013/0089781 A1*   4/2013   Miyazaki .......... H01M 10/4235
                                                                 429/211

(Continued)

FOREIGN PATENT DOCUMENTS

JP    2010-92664 A    4/2010
JP    2010-277862 A    12/2010

(Continued)

OTHER PUBLICATIONS

International Search Report dated May 21, 2019, issued in counterpart international Application No. PCT/JP2019/006522 (2 pages).

*Primary Examiner* — Christopher P Domone
*Assistant Examiner* — Jonathan William Estes
(74) *Attorney, Agent, or Firm* — WHDA, LLP

(57) ABSTRACT

A positive electrode for a secondary battery which is an example of the embodiment of the present invention comprises a collector, a protective layer formed on at least one surface of the collector, and a composite material layer formed on the protective layer. The protective layer has a first region and a second region. The first region includes inorganic particles and a conductive material. The second region includes inorganic particles and substantially does not include a conductive material, or includes inorganic particles and a conductive material, the content of the conductive material being less than the content of the conductive material in the first region.

5 Claims, 2 Drawing Sheets

(51) Int. Cl.
*H01M 4/13* (2010.01)
*H01M 10/0525* (2010.01)

(56) References Cited

U.S. PATENT DOCUMENTS

| | | | |
|---|---|---|---|
| 2016/0190566 A1 | 6/2016 | Shiozaki et al. | |
| 2016/0359166 A1* | 12/2016 | Han | H01M 4/366 |
| 2017/0187036 A1 | 6/2017 | Endo | |
| 2018/0123131 A1* | 5/2018 | Lee | H01M 10/052 |
| 2019/0088951 A1 | 3/2019 | Hanazaki et al. | |

FOREIGN PATENT DOCUMENTS

| | | |
|---|---|---|
| JP | 2010-287549 A | 12/2010 |
| JP | 2016/127000 A | 7/2016 |
| JP | 2017-120766 A | 7/2017 |
| JP | 2019-53912 A | 4/2019 |
| WO | 2010/086961 A1 | 8/2010 |
| WO | 2012/005301 A1 | 1/2012 |

* cited by examiner

POSITIVE ELECTRODE FOR SECONDARY BATTERY AND SECONDARY BATTERY

TECHNICAL FIELD

The present disclosure relates to a positive electrode for a secondary battery and a secondary battery.

BACKGROUND ART

Conventionally, a positive electrode for a secondary battery comprising: a current collector; a protective layer mainly composed of inorganic particles formed on the surface of the current collector; and a mixture layer formed on the protective layer has been known. For example, Patent Literature 1 discloses a positive electrode for a secondary battery having a protective layer formed on the surface of a current collector, the protective layer having a thickness of 1 μm to 5 μm and including: inorganic particles having an oxidizing power lower than that of the lithium-containing transition metal composite oxide being a positive electrode active material; and a conductive agent. The protective layer plays a role in, for example, separating an aluminum-based current collector and a lithium-containing transition metal composite oxide and thus suppressing the redox reaction related to a current collector to suppress heat generated when an internal short circuit occurs.

CITATION LIST

Patent Literature

PATENT LITERATURE 1: Japanese Unexamined Patent Application Publication No. 2016-127000

SUMMARY

The protective layer of a positive electrode is required to have a function of sufficiently suppressing heat generated when an internal short circuit occurs while suppressing the internal resistance of a battery to a low level. Generally, increase in the amount of the conductive agent in the protective layer leads a problem of increasing the amount of heat generated when an internal short circuit occurs although the internal resistance decreases. The positive electrode comprising a protective layer is required to decrease the resistance without increasing the amount of the conductive agent in the protective layer and to suppress heat generated when an abnormality occurs.

The positive electrode for a secondary battery according to one aspect of the present disclosure comprises a current collector, a protective layer formed on at least one surface of the current collector, and a mixture layer formed on the protective layer. The protective layer has a first region and a second region, and the first region includes inorganic particles and a conductive agent. The second region includes the inorganic particles and is substantially free of the conductive agent, or includes the inorganic particles and the conductive agent, and the content of the conductive agent in the second region is lower than the content of the conductive agent in the first region.

The secondary battery according to one aspect of the present disclosure comprises the above positive electrode, a negative electrode, and an electrolyte.

Advantageous Effects of Invention

One aspect of the present disclosure can provide a positive electrode for a secondary battery capable of sufficiently suppressing heat generated when an abnormality occurs while suppressing the internal resistance of the battery to a low level.

DESCRIPTION OF EMBODIMENTS

The protective layer interposed between a positive electrode current collector and a positive electrode mixture layer has a function of suppressing heat generated when an internal short circuit occurs. As described above, in the positive electrode comprising the protective layer, it is an important issue to reduce the resistance of the protective layer and decrease the internal resistance of a battery without increasing the amount of a conductive agent added. The present inventors have succeeded in sufficiently suppressing heat generated when an abnormality occurs while suppressing the internal resistance of a battery to a low level by providing the protective layer including the first region and the second region. Unevenly distributing a conductive agent in the first region of the protective layer can efficiently form a conductive path despite of a small amount of the conductive agent included in the entire protective layer, and this is considered to realize the present effect.

Hereinafter, an example of the embodiment of a positive electrode for a secondary battery and a secondary battery according to the present disclosure will be described in detail with reference to the drawings. Hereinafter, a cylindrical battery in which a wound electrode body 14 is housed in a cylindrical battery case is exemplified, and the electrode assembly is not limited to the wound type, and may be a laminate in which a plurality of positive electrodes and a plurality of negative electrodes are alternately laminated one by one via a separator. In addition, the secondary battery according to the present disclosure may be a rectangular battery having a rectangular metal case, a coin battery having a coin-shaped metal case, or the like, and a laminated battery including an exterior body being composed of a laminate sheet including a metal layer and a resin layer.

Figure 1:
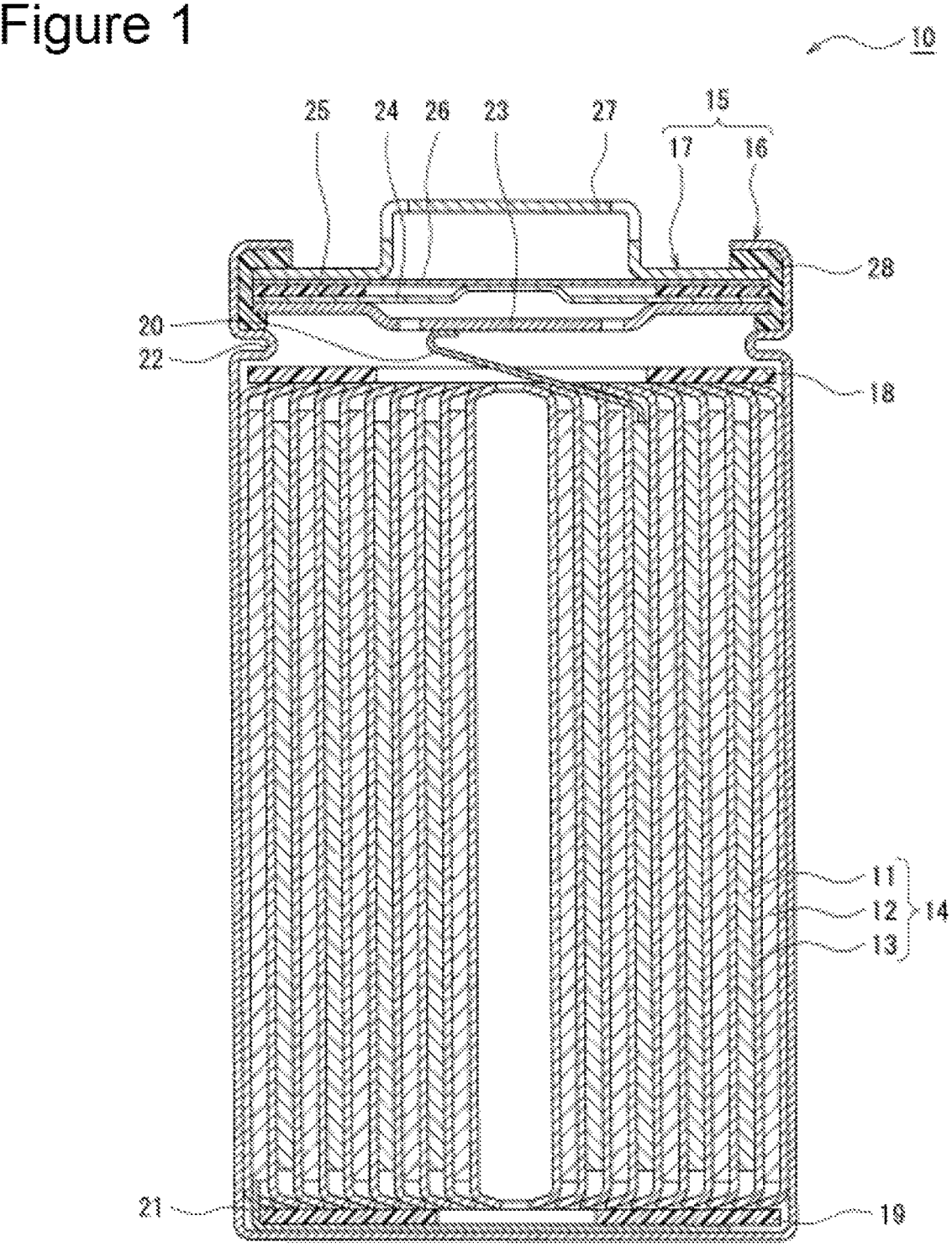
FIG. 1 is a sectional view of a secondary battery according to an example of the embodiment.

FIG. 1 is a sectional view of a secondary battery 10 according to an example of the embodiment. As illustrated in FIG. 1, the secondary battery 10 includes an electrode assembly 14, a electrolyte, and a battery case 15 that houses the electrode assembly 14 and the electrolyte. The electrode assembly 14 includes a positive electrode 11, a negative electrode 12, and a separator 13, and has a wound structure in which the positive electrode 11 and the negative electrode 12 are wound via the separator 13. A battery case 15 is composed of a bottomed cylindrical exterior can 16 and a sealing assembly 17 that closes the opening of the exterior can 16. The secondary battery 10 may be a secondary battery using an aqueous electrolyte, or may be a secondary battery using a non-aqueous electrolyte. Hereinafter, the secondary battery 10 will be described as a non-aqueous electrolyte secondary battery such as a lithium ion battery using a non-aqueous electrolyte.

A non-aqueous electrolyte includes a non-aqueous solvent and an electrolyte salt dissolved in the non-aqueous solvent. For example, esters, ethers, nitriles, amides, and a mixed solvent of two or more thereof may be used as the non-aqueous solvent. The non-aqueous solvent may contain a halogen substitute in which at least a part of hydrogen of these solvents is substituted with a halogen atom such as fluorine. The non-aqueous electrolyte is not limited to a liquid electrolyte, and may be a solid electrolyte. For example, a lithium salt such as $LiPF_6$ is used as the electrolyte salt.

The secondary battery 10 includes insulating plates 18 and 19 arranged above and below the electrode assembly 14, respectively. In the example shown in FIG. 1, a positive electrode lead 20 attached to the positive electrode 11 extends to the side of the sealing assembly 17 through the through hole of the insulating plate 18, and a negative electrode lead 21 attached to the negative electrode 12 extends to the bottom side of the exterior can 16 through the outside of the insulating plate 19. The positive electrode lead 20 is connected to the lower surface of a bottom plate 23 of the sealing assembly 17, by welding or the like, and a cap 27, which is a top plate of the sealing assembly 17 electrically connected to the bottom plate 23, serves as a positive electrode terminal. The negative electrode lead 21 is connected to the inner surface of bottom of the exterior can 16 by welding or the like, and the exterior can 16 serves as a negative electrode terminal.

The exterior can 16 is, for example, a metal container with a bottomed cylindrical shape. A gasket 28 is provided between the exterior can 16 and the sealing assembly 17 to ensure the sealability inside the battery. The exterior can 16 has, for example, a projecting portion 22 for supporting the sealing assembly 17, in which a part of the side surface of the exterior can 16 protrudes inward. The projecting portion 22 is preferably formed in an annular shape along the circumferential direction of the exterior can 16, and the sealing assembly 17 is supported on the upper surface thereof.

The sealing assembly 17 has a structure in which a bottom plate 23, a lower vent member 24, an insulating member 25, an upper vent member 26, and a cap 27 are laminated in this order from the electrode assembly 14 side. Each member constituting the sealing assembly 17 has a disk shape or ring shape, for example, and each member except the insulating member 25 is electrically connected each other. The lower vent member 24 and the upper vent member 26 are connected together at their respective central portions, and the insulating member 25 is interposed between the respective peripheral portions. When the internal pressure of the battery rises due to abnormal heat generation, the lower vent member 24 is deformed and broken so as to push the upper vent member 26 toward the cap 27 side, and the current path between the lower vent member 24 and the upper vent member 26 is blocked. When the internal pressure further rises, the upper vent member 26 is broken and gas is discharged from the opening of the cap 27.

Hereinafter, the positive electrode 11, the negative electrode 12, and the separator 13 constituting the electrode assembly 14, particularly the positive electrode 11 will be described in detail.

[Positive Electrode]

Figure 2:
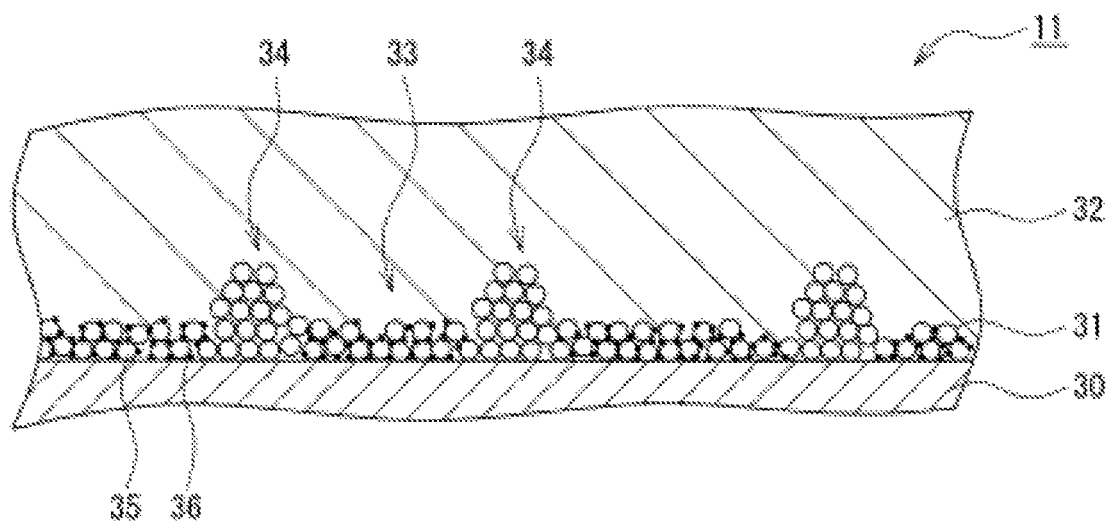
FIG. 2 is a sectional view of a positive electrode for a secondary battery according to an example of the embodiment.

FIG. 2 is a sectional view of the positive electrode 11 according to an example of the embodiment. The positive electrode 11 comprises: a positive electrode current collector 30; a protective layer 31 formed on at least one surface of the positive electrode current collector 30; and a positive electrode mixture layer 32 formed on the protective layer 31. The protective layer 31 is preferably formed on both sides of the positive electrode current collector 30. The positive electrode mixture layer 32 includes a positive electrode active material, a conductive agent, and a binder, and is formed on both sides of the positive electrode current collector 30 via the protective layer 31.

The positive electrode 11 is produced by, for example, applying the protective layer slurry on both sides of the positive electrode current collector 30, drying the coating film to form the protective layer 31, and then forming a positive electrode mixture layer 32 on the protective layer 31. The positive electrode mixture layer 32 is formed on both sides of the positive electrode current collector 30 via the protective layer 31 by applying onto the protective layer 31 a positive electrode mixture slurry including a positive electrode active material, a conductive agent, a binder, and the like, drying the coating film, and then compressing.

A foil of a metal stable in the potential range of the positive electrode 11 such as aluminum or almsman alloy, a film in which the metal is disposed on the surface, or the like can be used as the positive electrode current collector 30. The content of aluminum in the positive electrode current collector 30 is 50% or more, preferably 70% or more, and more preferably 80% or more with respect to the mass of the current collector. The preferable positive electrode current collector 30 is a metal foil consisting of aluminum or an aluminum alloy and has a thickness of 5 μm to 20 μm.

A lithium-containing transition metal composite oxide containing transition metal elements such as Co, Mn, and Ni is used as the positive electrode active material. Examples of the lithium-containing transition metal composite oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (M: at least one of the group consisting of Na, Mg. Sc, Y. Mn, Fe, Co, Ni, Cu, Zn, Al, Cr, Pb, Sb, and B, $0<x\leq1.2$, $0<y\leq0.9$, $2.0\leq z\leq2.3$). These may be used singly or in combination of two or more.

Examples of the conductive agent included in the positive electrode mixture layer 32 include carbon materials such as carbon black (CB), acetylene black (AB), ketjen black, and graphite. Examples of the binder included in the positive electrode mixture layer 32 include fluorine resins such as polytetrafluoroethylene (PTFE) and polyvinylidene fluoride (PVdF), polyacrylonitrile (PAN), polyimide resins, acrylic resins, and polyolefin resins. In addition, these resins may be used in combination with carboxymethylcellulose (CMC) or a salt thereof, or polyethylene oxide (PEO). These may be used singly or in combination of two or more.

As described above, the protective layer 31 is interposed between the positive electrode current collector 30 and the positive electrode mixture layer 32. When an internal short circuit occurs in a battery, or a battery is exposed to high temperatures, a redox reaction may occur between the positive electrode current collector 30 including aluminum as the main component and the lithium-containing transition metal composite oxide as the positive electrode active material, leading to a large amount of heat generated. Providing the protective layer 31 can separate the positive electrode current collector 30 and the positive electrode mixture layer 32 to suppress heat generated when an abnormality occurs.

The protective layer 31 has a first region 33 and a second region 34. The first region 33 is a region including inorganic particles 35 and a conductive agent 36. On the other hand, the second region 34 is a region including the inorganic particles 35 and being substantially free of the conductive agent 36. Alternatively, the second region 34 is a region in which the inorganic particles 35 and the conductive agent 36 are included, and the content of the conductive agent 36 is lower than the content of the conductive agent 36 in the first region 33. The content of the conductive agent 36 in the second region 34 is, for example, 0% to 50%, preferably 10% or less, and more preferably 5% or less of the content of the conductive agent 36 in the first region 33.

Preferably, the second region 34 is evenly scattered over the entire surface of the positive electrode current collector 30 without being unevenly scattered. The protective layer 31 has, for example, a sea-island structure consisting of a continuously formed first region 33 and an island-shaped second region 34. The thickness of the protective layer 31 is larger in the second region 34 than in the first region 33. An example of the thickness of the protective layer 31 in the first region 33 is 1 μm to 10 μm, and preferably 1 μm to 5 μm. An example of the thickness of the protective layer 31 in the second region 34 is 1 μm to 100 μm, and preferably 1 μm to 50 μm.

The protective layer 31 includes the inorganic particles 35, the conductive agent 36, and a binder, and is composed mainly of the inorganic particles 35. The content of the inorganic particles 35 is preferably 60% by mass to 99.8% by mass, and more preferably 90% by mass to 99% by mass, with respect to the mass of the protective layer 31. The content of the inorganic particles 35 in the second region 34 is higher than the content of the inorganic particles 35 in the first region 33. As described above, the conductive agent 36 exists only in the first region 33, or exists in a higher density in the first region 33 than in the second region 34. The second region 34 may substantially consist of only the inorganic particles 35 and a binder.

Preferably, the particles of an inorganic compound having an oxidizing power lower than that of the lithium-containing transition metal composite oxide are used as the inorganic particles 35. Specific examples of the inorganic compound include inorganic oxides such as manganese oxide, silicon dioxide, titanium dioxide, and aluminum oxide. Of these, aluminum oxide (alumina) is preferable. The fast region 33 and the second region 34 may include the inorganic particles 35 having different compositions, but preferably include the inorganic particles 35 having the same composition, from the viewpoint such as productivity.

One that is the same as the conductive agent applied to the positive electrode mixture layer 32 can be used as the conductive agent 36, for example a carbon material such as CB. AB, ketjen black-, or graphite. The content of the conductive agent 36 in the first region 33 is preferably 0.5% by mass to 20% by mass, and more preferably 1% by mass to 6% by mass, with respect to the mass of the first region 33. When the conductive agent 36 is included in the second region 34, the content thereof is lower than the content of the conductive agent 36 in the first region 33, for example, is less than 5% by mass, preferably less than 1% by mass, more preferably less than 0.5% by mass, and particularly preferably less than 0.1% by mass, with respect to the mass of the second region 34.

The first region 33 is, for example, a region in which the content of the conductive agent 36 per unit volume is 1% by mass or more. The second region 34 is, for example, a region in which the content of the conductive agent 36 per unit volume is less than 1% by mass, less than 0.5% by mass, or less than 0.1% by mass. The content of the conductive agent 36 in the second region 34 may be 0% by mass (less than the detection limit). The first region 33 and the second region 34 may include the conductive agent 36 having different compositions, but preferably include the conductive agent 36 having the same composition, from the viewpoint such as productivity.

One that is the same as the conductive agent applied to the positive electrode mixture layer 32 can be used as the binder included in the protective layer 31, for example fluorine resins such as PTFE and PVdF, PAN, polyimide resin, acrylic resin, and polyolefin resin. The content of the binder is preferably 0.1% by mass to 10% by mass, and more preferably 1% by mass to 5% by mass, with respect to the mass of the protective layer 31. The content of the binder in the second region 34 may be higher than the content of the binder in the first region 33. The first region 33 and the second region 34 may include the binder having different compositions, but preferably include the binder having the same composition, from the viewpoint such as productivity.

The contents of the inorganic particles 35, the conductive agent 36, and the binder per unit volume of the protective layer 31 are determined by observing the cross section of the protective layer 31 with a scanning electron microscope (SEM) or a transmission electron microscope (TEM) and element mapping.

The protective layer 31 may include the inorganic particles 35 in the form of secondary particles in the second region 34. That is, the second region 34 may be composed of secondary particles of the inorganic particles 35. On the other hand, the inorganic particles 35 included in the first region 33 preferably exist in the form of primary particles. Even when the secondary particles of the inorganic particles 35 are included in the first region 33, the particle size of the secondary particles in the first region 33 is smaller than the particle size of the secondary particles included in the second region 34.

The average particle size of the primary particles of the inorganic particles 35 is, for example, 0.05 μm to 2 μm, and preferably 0.05 μm to 1 μm. The average particle size of the secondary particles of the inorganic particles 35 included in the second region 34 is, for example, 1 μm to 100 μm, preferably 3 μm to 50 μm, and more preferably 10 μm to 50 μm. The average particle sizes of the primary particles and the secondary particles of the inorganic particles 35 are determined by observing the cross section of the protective layer 31 with SEM or TEM. Specifically, the average particle size of the primary particles is calculated by measuring the diameters of the circumscribed circles for 100 primary particles arbitrarily selected from the cross-sectional image of the protective layer 31 and then by averaging the diameters (the same applies to the secondary particles).

The protective layer 31 has voids, and the void ratio per unit volume differs between the first region 33 and the second region 34. The void ratio of the second region 34 is larger than the void ratio of the first region 33, and is, for example, 10% to 50% and preferably 20% to 40%. An example of the void ratio of the first region 33 is 5% to 25%. The void ratio was determined by measuring the proportion of voids (portions without the inorganic particles 35, the conductive agent 36, and the binder) in the 1.5 μm×1.5 μm square area of the cross-sectional image of the protective layer 31.

As described above, the second region 34 is scattered on the surface of the positive electrode current collector 30. The area per one of the second regions 34 is, for example, 0.5 μm$^2$ to 35000 μm$^2$, preferably 70 μm$^2$ to 32000 μm, more preferably 300 μm$^2$ to 5000 μm$^2$, and particularly preferably 500 μm$^2$ to 2500 μm$^2$. The proportion of the total area of the second region 34 in the surface of the positive electrode current collector 30 is preferably 40% or less, more preferably 3% to 35%, and particularly preferably 5% to 30%. The area of the second region 34 can be measured by immersing the positive electrode 11 in an alkaline solution to dissolve the positive electrode current collector 30 and then by observing the surface of the protective layer 31 on the side of the positive electrode current collector 30 with an optical microscope, SEM, or TEM.

The protective layer 31 can be formed by applying a protective layer slurry including the inorganic particles 35, the conductive agent 36, and a binder onto the surface of the positive electrode current collector 30 and then drying the coating film. The dispersion medium of the protective layer slurry is not particularly limited, but a preferable example is N-methyl-2-pyrrolidone (NMP). Changing the method of stirring and kneading the protective layer slurry, the method of blending slurry raw materials, and the like can adjust the dispersibility of the particle mixture, and can change the amount and particle size of the secondary particles of the inorganic particles 35 included in the slurry. Generally, stronger stirring of the slurry results in smaller amount of secondary particles and smaller particle size. A slurry including a predetermined amount of secondary particles is used without removing the secondary particles of the inorganic particles 35 by filtration or the like, thereby allowing formation of the protective layer 31 having sea-island structures of the first region 33 and the second region 34. The protective layer 31 is formed on the surface of the positive electrode current collector 30 at a surface density of, for example, 0.1 g/m$^2$ to 20 g/m$^2$.

[Negative Electrode]

A negative electrode 12 comprises a negative electrode current collector and a negative electrode mixture layer formed on at least one surface of the negative electrode current collector. A foil of a metal stable in the potential range of the negative electrode 12 such as copper or copper alloy, a film in which the metal is disposed on the surface, or the like can be used as the negative electrode current collector. Preferably, the negative electrode mixture layer includes a negative electrode active material and a binder, and is formed on both sides of the negative electrode current collector. The negative electrode 12 can be produced by applying a negative electrode mixture slurry including a negative electrode active material and a binder onto a negative electrode current collector, drying the coating film, and then compressing to form the negative electrode mixture layer on both sides of the negative electrode current collector.

The negative electrode active material is not particularly limited as long as it can reversibly intercalate and deintercalate lithium ions, and a carbon material such as graphite is generally used. The graphite may be any of natural graphite such as flake graphite, lump graphite, and earth graphite and artificial graphite such as lump artificial graphite and graphitized mesophase carbon microbeads. In addition, as the negative electrode active material, metals such as Si and Sn that are alloyed with Li, metal compounds including Si and Sn, and lithium titanium composite oxides may be used. The Si-containing compound represented by $SiO_x$ ($0.5 \leq x \leq 1.6$) may be used in combination with a carbon material such as graphite.

As a binder included in the negative electrode mixture layer, fluorine-containing resin such as PTFE and PVdF, PAN, polyimide, acrylic resin, and polyolefins may be used as in the case of the positive electrode 11, but styrene-butadiene rubber (SBR) is preferably used. In addition, the negative electrode mixture layer may include CMC or a salt thereof, polyacrylic acid (PAA) or a salt thereof, PVA, or the like. The negative electrode mixture layer 41 includes, for example, SBR and CMC or a salt thereof.

[Separator]

As a separator 13, a porous sheet having ion permeability and insulating property is used. Specific examples of the porous sheet include a microporous thin film, a woven fabric, and a non-woven fabric. As the material of the separator, polyolefins such as polyethylene and polypropylene, cellulose, and the like are suitable. The separator 13 may have a single-layer structure or a laminated structure. In addition, on the surface of the separator 13, a resin layer having high heat resistance such as an aramid resin or a filler layer including a filler of an inorganic compound may be provided.

EXAMPLES

Hereinafter, the present disclosure will be further described with reference to examples, but the present disclosure is not limited to these examples.

Example 1

[Production of Positive Electrode]

93.5 parts by mass of aluminum oxide ($Al_2O_3$), 5 parts by mass of acetylene black (AB), and 1.5 parts by mass of polyvinylidene fluoride (PVdF) were mixed to prepare a particle mixture. Thereafter, the particle mixture was added to N-methyl-2-pyrrolidone (NMP) and stirred by using a stirrer (thin film swirling high-speed mixer, FILMIX, manufactured by PRIMIX Corporation) to prepare a protective layer slurry. The slurry was applied onto both sides of the positive electrode current collector consisting of aluminum foil having a thickness of 15 μm and the coating film was dried, thereby forming the protective layer having a sea-island structure consisting of the first region including AB and the second region substantially free of AB.

The sea-island structure consisting of the first region and the second region was confirmed by observing the surface of the protective layer with SEM. In the present example, the region where the AB content was less than the detection limit (0%) was defined as the second region and the other regions were defined as the first region by element mapping of the protective layer. The AB content in the first region was substantially uniform (about 5% by mass). As a result of SEM observation of the surface of the protective layer, the average value of each area of the second regions was 7 μm$^2$ and the proportion of the total area of the second region in the surface of the current collector was 1%. In addition, the average value of the void ratio of the first region was 17.7%, and the average value of the void ratio of the second region was 30.0%.

A lithium-containing transition metal composite oxide represented by $LiNi_{0.5}Co_{0.2}Mn_{0.3}O_2$ was used as a positive electrode active material. The positive electrode active material, AB, and PVdF were mixed in a solid content mass ratio of 97:2:1, and an appropriate amount of NMP was added to prepare a positive electrode mixture slurry. Thereafter, the positive electrode mixture slurry was applied onto both sides of the positive electrode current collector on which the protective layer was formed, and the coating film was dried. This was cut into a predetermined electrode size and the coating film was compressed by using a roller to produce a positive electrode in which the protective layer and the positive electrode mixture layer were formed in this order on both sides of the positive electrode current collector.

[Production of Negative Electrode]

Graphite powder, CMC-Na, and a dispersion of SBR were mixed at a solid content mass ratio of 98.7:0.7:0.6 and added with an appropriate amount of water to prepare a negative electrode mixture slurry. Thereafter, the negative electrode mixture slurry was applied onto both sides of the negative electrode current collector consisting of copper foil and the coating film was dried. This was cut into a predetermined electrode size and compressed by using a roller to produce a negative electrode in which the negative electrode mixture layer was formed on both sides of the negative electrode current collector.

[Preparation of Non-Aqueous Electrolyte]

Ethylene carbonate (EC), ethyl methyl carbonate (EMC), and dimethyl carbonate (DMC) were mixed in a volume ratio of 3:3:4. $LiPF_6$ was dissolved in the mixed solvent so as to obtain a concentration of 1.2 mol/L to prepare a non-aqueous electrolyte.

[Production of Battery]

An aluminum lead was attached to the above positive electrode, a nickel lead was attached to the above negative electrode, and the positive electrode and the negative electrode were spirally wound via a polyethylene separator to produce a wound electrode assembly. The electrode assembly was accommodated in a bottomed cylindrical battery case body having an outer diameter of 18.2 mm and a height of 65 mm, the above non-aqueous electrolyte solution was injected therein, the opening of the battery case body was sealed with a gasket and a sealing assembly to produce a 18650 type cylindrical non-aqueous electrolyte secondary battery.

[Measurement of Internal Resistance]

The internal resistance of the above secondary battery was measured by the following procedure.

At 25° C., the above secondary battery was charged with a constant current of 0.3 It (600 mA) until the battery voltage became 4.2 V, and then charged at a constant voltage. Thereafter, the resistance between the terminals of the secondary battery was measured by using a low resistance meter (AC 4-terminal method with a measurement frequency of 1 kHz), and the measured resistance value was regarded as the internal resistance. Table 1 shows the measured values. The values shown in Table 1 are relative values when the internal resistance of the secondary battery in Comparative Example 1 described below is 1.00.

[Test at Foreign Substance Short Circuit (Measurement of Battery Temperature)]

For the above secondary battery, the battery temperature at forced short circuit by foreign substance was measured by the following procedure.

(1) At 25° C., the above secondary battery was charged with a constant current of 0.3 It (600 mA) until the battery voltage became 4.2 V, and then charged at a constant voltage.

(2) The charged secondary battery was disassembled, the electrode assembly was taken out, a small piece of nickel was inserted between the positive electrode and the negative electrode, and pressure was applied to the insertion portion to perform a forced short circuit.

(3) The maximum temperature reached on the side of the battery after applying pressure was measured.

Examples 2 to 19

A secondary battery was produced in the same manner as in Example 1 except that the stirring conditions were changed in the preparation of the protective layer slurry and a protective layer including the second region shown in Table 1 was formed, and the above performance evaluation was performed. In Examples 9 to 16, a high-speed disperser, homodisper, manufactured by PRIMIX Corporation was used as the stirrer. For the stirring conditions, each area of the second regions can be smaller with increasing the stirring speed of the stirrer during the predetermined stirring time. In addition, each area of the second regions and the total area of the second regions can be decreased with increasing the stirring time at a predetermined stirring speed.

Comparative Example 1

A secondary battery was produced in the same manner as in Example 1 except that the secondary particles having a particle size of 0.5 μm or more were removed in the preparation of the protective layer slurry to form the protective layer in which there was no secondary region and the conductive agent (AB) was uniformly included over the entire layer, and the above performance evaluation was performed.

Reference Example 1

A secondary battery was produced in the same manner as in Example 1 except that the battery was produced by using a positive electrode not including a protective layer, and the above performance evaluation was performed. As a specific method of producing a positive electrode, a positive electrode mixture slurry was applied onto both sides of a positive electrode current collector on which a protective layer was not formed, and the coating film was dried. This was cut into a predetermined electrode size and compressed by using a roller to produce a positive electrode in which the only positive electrode mixture layer was formed on both sides of the positive electrode current collector.

The battery in Reference Example 1 does not include a protective layer, and therefore is not affected by an increase in internal resistance due to the inclusion of the protective layer. Reference Example 1 shows an increase in battery temperature resulted from a foreign substance short circuit inside the battery in the battery using the positive electrode that does not include a protective layer. In other words, using the positive electrode including a protective layer (Examples 1 to 19 and Comparative Example 1) can suppress an increase in battery temperature at foreign substance short circuit inside the battery.

TABLE 1

| | Protective layer | | Battery performance | |
| --- | --- | --- | --- | --- |
| | Each area of the second regions | Total area of the second regions | Internal resistance | Battery temperature |
| Example 1 | 7 μm² | 1% | 0.99 | 33° C. |
| Example 2 | 7 μm² | 5% | 0.97 | 48° C. |
| Example 3 | 7 μm² | 10% | 0.94 | 55° C. |
| Example 4 | 7 μm² | 30% | 0.93 | 62° C. |
| Example 5 | 78 μm² | 1% | 0.96 | 34° C. |
| Example 6 | 78 μm² | 5% | 0.94 | 48° C. |
| Example 7 | 78 μm² | 10% | 0.91 | 56° C. |
| Example 8 | 78 μm² | 30% | 0.90 | 70° C. |
| Example 9 | 706 μm² | 1% | 0.93 | 35° C. |
| Example 10 | 706 μm² | 5% | 0.90 | 50° C. |
| Example 11 | 706 μm² | 10% | 0.89 | 56° C. |
| Example 12 | 706 μm² | 30% | 0.87 | 69° C. |
| Example 13 | 1960 μm² | 1% | 0.92 | 38° C. |
| Example 14 | 1960 μm² | 5% | 0.90 | 55° C. |
| Example 15 | 1960 μm² | 10% | 0.88 | 60° C. |

TABLE 1-continued

| | Protective layer | | Battery performance | |
|---|---|---|---|---|
| | Each area of the second regions | Total area of the second regions | Internal resistance | Battery temperature |
| Example 16 | 1960 μm² | 30% | 0.86 | 80° C. |
| Example 17 | 0.8 μm² | 1% | 1.00 | 33° C. |
| Example 18 | 0.8 μm² | 5% | 1.00 | 45° C. |
| Example 19 | 0.8 μm² | 30% | 1.00 | 62° C. |
| Comparative Example 1 | No second regions | | greater than 1.10 | 32° C. |
| Reference Example 1 | No protective layer | | 0.70 | greater than 100° C. |

As can be seen from the results shown in Table 1, all of the secondary batteries in the examples have lower internal resistance than the secondary battery in Comparative Example 1. In addition, all of the secondary batteries in the examples generate less heat when a foreign substance short circuit occurs than the secondary battery in Reference Example 1. That is, using the positive electrode including the protective layer having the 10 second region substantially free of a conductive agent can sufficiently suppress heat generated when a short circuit occurs while keeping the internal resistance of the battery low. In addition, in each example, the internal resistance of the battery can be suppressed to a low level with increasing each area and the total area of the second regions in the protective layer.

Example 20

A secondary battery was produced in the same manner as in Example 1 except that the method of preparing a protective layer slurry was changed.

[Production of Protective Layer]

93.2 parts by mass of aluminum oxide ($Al_2O_3$), 5.3 parts by mass of acetylene black (AB), and 1.5 parts by mass of polyvinylidene fluoride (PVdF) were mixed to prepare a particle mixture. Thereafter, the particle mixture was added to N-methyl-2-pyrrolidone (NMP) and stirred by using a stirrer (ROBOMIX manufactured by Tokushu Kika Kogyo Co., Ltd.) to prepare a first protective layer slurry. 98.5 parts by mass of aluminum oxide ($A_2O_3$) and 1.5 parts by mass of polyvinylidene fluoride (PVdF) were mixed to prepare a particle mixture. Thereafter, the particle mixture was added to N-methyl-2-pyrrolidone (NMP) and stirred by using a stirrer (ROBOMIX manufactured by Tokushu Kika Kogyo Co., Ltd.) to prepare a second protective layer slurry. 95.0 parts by mass of the first slurry and 5.0 parts by mass of the second slurry were mixed and stirred by using a stirrer (ROBOMIX manufactured by Tokushu Kika Kogyo Co., Ltd.) to prepare a protective layer slurry. The stirring of the mixture of the first slurry and the second slurry was completed at a low speed and in a short time, and thereby the protective layer slurry included the region caused by the first slurry and the region caused by the second slurry.

The protective layer slurry was applied onto both sides of the positive electrode current collector consisting of aluminum foil having a thickness of 15 μm and the coating film was dried, thereby forming the protective layer having a sea-island structure consisting of the first region including AB and the second region substantially free of AB. The sea-island structure consisting of the first region and the second region was confirmed by observing the surface of the protective layer with SEM. The first region is the region caused by the first slurry, and the second region is the region caused by the second slurry.

In Example 20, the region where the AB content was less than 1% was defined as the second region and the other regions were defined as the first region by element mapping of the protective layer. The AB content in the first region was substantially uniform (about 5% by mass). As a result of SEM observation of the surface of the protective layer, the average value of each area of the second regions was 1704 μm², and the proportion of the total area of the second region in the surface of the current collector was 5%. In addition, the average value of the void ratio of the first region was 17.7%, and the average value of the void ratio of the second region was 25.0%.

The above performance evaluation was also performed on the secondary battery in Example 20, and as a result, the internal resistance was 0.90 and the battery temperature in the test of foreign substance short circuit was 50° C. In the secondary battery in Example 20, heat generated when a short circuit occurs can also be sufficiently suppressed while suppressing the internal resistance of the battery to a low level. When the first slurry and the second slurry are used to prepare the protective layer slurry as in Example 20, the inorganic particles constituting the first slurry may be different from the inorganic particles constituting the second slurry.

REFERENCE SIGNS LIST

10 secondary battery. 11 positive electrode, 12 negative electrode, 13 separator, 14 electrode assembly, 15 battery case. 16 exterior can, 17 sealing assembly, 18, 19 insulating plate, 20 positive electrode lead, 21 negative electrode lead, 22 projecting portion, 23 bottom plate, 24 lower vent member, 25 insulating member, 26 upper vent member, 27 cap, 28 gasket, 30 positive electrode current collector, 31 Protective layer, 32 Positive electrode mixture layer, 33 First region, 34 Second region, 35 Inorganic particles, 36 Conductive agent

The invention claimed is:

1. A positive electrode for a secondary battery, comprising:

A current collector;

a protective layer formed on at least one surface of the current collector; and a mixture layer formed on the protective layer, wherein the protective layer has a first region and a plurality of second regions, the first region includes inorganic particles and a conductive agent, each of the plurality of second regions includes the inorganic particles and less than a detection limit of the conductive agent, or includes the inorganic particles and no less than the detection limit of the conductive agent, and a content in % by mass, of the conductive agent in each of the plurality of second regions with respect to a total mass of the each of the plurality of second regions is lower than a content, in % by mass, of the conductive agent in the first region with respect to a total mass of the first region, wherein the plurality of second regions are scattered on a surface of the current collector and an area per one of the plurality of second regions is 70 μm² to 32000 μm², wherein the protective layer includes a binder, and a content of the binder is 0.1% by mass to 10% by mass with respect to a total mass of the protective layer, and wherein a void ratio of the plurality of second regions is larger than a void ratio of the first region and is 10% to 50%.

2. The positive electrode for a secondary battery according to claim 1, wherein the content, in % by mass, of the conductive agent in each of the plurality of second regions with respect to a total mass of the each of the plurality of second regions is 0% to 50% of the content, in % by mass, of the conductive agent in the first region with respect to a total mass of the first region.

3. The positive electrode for a secondary battery according to claim 1, wherein the inorganic particles included in the plurality of second regions are secondary particles formed by aggregation of first particles.

4. The positive electrode for a secondary battery according to claim 1, wherein a proportion of a total area of the plurality of second regions to a surface of the current collector is 40% or less.

5. A secondary battery comprising: the positive electrode for a secondary battery according to claim 1; a negative electrode; and an electrolyte.

* * * * *